United States Patent
Metcalfe (10) Patent No.: US 9,990,692 B2
(45) Date of Patent: *Jun. 5, 2018

(54) SYSTEMS AND METHODS OF PARTIAL FRAME BUFFER UPDATING

(71) Applicant: Imagination Technologies Limited, Kings Langley (GB)

(72) Inventor: John A. Metcalfe, Dunstable (GB)

(73) Assignee: Imagination Technologies Limited, Kings Langley (GB)

(*) Notice: Subject to any disclaimer, the term of this patent is extended or adjusted under 35 U.S.C. 154(b) by 0 days. days.

This patent is subject to a terminal disclaimer.

(21) Appl. No.: 15/586,659

(22) Filed: May 4, 2017

(65) Prior Publication Data

US 2017/0301057 A1 Oct. 19, 2017

Related U.S. Application Data

(63) Continuation of application No. 14/016,171, filed on Sep. 2, 2013, now Pat. No. 9,672,584.

(60) Provisional application No. 61/697,785, filed on Sep. 6, 2012.

(51) Int. Cl.
*G06T 1/60* (2006.01)
(52) U.S. Cl.
CPC .................................. *G06T 1/60* (2013.01)
(58) Field of Classification Search
CPC ...................................................... G09G 5/393
See application file for complete search history.

(56) References Cited

U.S. PATENT DOCUMENTS

| 4,695,883 | A | * | 9/1987 | Chandler | H04N 11/04 348/14.15 |
| 5,220,312 | A | | 6/1993 | Lumelsky et al. | |
| 5,353,061 | A | * | 10/1994 | Rodriguez | H04N 9/8045 375/240.12 |
| 5,586,200 | A | | 12/1996 | Devaney et al. | |

(Continued)

OTHER PUBLICATIONS

Liktor et al. Decoupled deferred shading for hardware rasterizationin: Proceedings of the ACM SIGGRAPH Symposium on Interactive 3D Graphics and Games. ACM, 2012. S. 143-150.

(Continued)

*Primary Examiner* — Gregory J Tryder
*Assistant Examiner* — Jitesh Patel
(74) *Attorney, Agent, or Firm* — Vorys, Sater, Seymour and Pease LLP; Vincent M DeLuca (57) ABSTRACT

Aspects include a pixel source that produces data for a rendered surface divided into regions. A mapping identifies memory segments storing pixel data for each region of the surface. The mapping can identify memory segments storing pixel data from a prior rendered surface, for regions that were unchanged during rendering the rendering. Such changed/unchanged status is tracked on a region by region basis. A counter can be maintained for each memory segments to track how many surfaces use pixel data stored therein. A pool of free memory segments can be maintained. Reading a surface, such as to display a rendered surface by a display controller, includes identifying and reading the mapping to identify each memory segment storing pixel data for regions of the surface, reading such, and updating the counters for the memory segments that were read.

17 Claims, 8 Drawing Sheets

(56) References Cited

U.S. PATENT DOCUMENTS

| | | | |
|---|---|---|---|
| 5,995,120 A * | 11/1999 | Dye | G06F 12/08 345/501 |
| 6,072,548 A * | 6/2000 | Schoner | G06T 1/60 345/520 |
| 6,457,034 B1 | 9/2002 | Morein | |
| 7,170,526 B1 | 1/2007 | Johnson | |
| 8,120,621 B1 * | 2/2012 | Ogrinc | G09G 5/36 345/211 |
| 2004/0001544 A1 | 1/2004 | Mehrotra | |
| 2004/0008785 A1 | 1/2004 | Turaga et al. | |
| 2004/0179018 A1 * | 9/2004 | Sabella | G09G 5/393 345/536 |
| 2004/0179019 A1 | 9/2004 | Sabella et al. | |
| 2005/0129120 A1 | 6/2005 | Jeon | |
| 2005/0168471 A1 | 8/2005 | Paquette | |
| 2005/0185713 A1 | 8/2005 | Winger et al. | |
| 2006/0193388 A1 | 8/2006 | Woods et al. | |
| 2007/0064808 A1 | 3/2007 | Ishii et al. | |
| 2007/0116437 A1 | 5/2007 | Pun et al. | |
| 2007/0165042 A1 | 7/2007 | Yagi | |
| 2008/0002773 A1 * | 1/2008 | Lai | H04N 19/61 375/240.16 |
| 2008/0222581 A1 * | 9/2008 | Banerjee | G06F 17/5045 716/136 |
| 2009/0109127 A1 | 4/2009 | Chang et al. | |
| 2009/0161766 A1 | 6/2009 | Bronstein et al. | |
| 2010/0195721 A1 | 8/2010 | Wu et al. | |
| 2011/0199385 A1 | 8/2011 | Enderton | |
| 2012/0050313 A1 | 3/2012 | Gruber | |
| 2014/0147044 A1 | 5/2014 | Takada | |

OTHER PUBLICATIONS

Then et al. "The video mesh: A data structure for image-based three-dimensional video editing" In: Computational Photography (ICCP), 2011 IEEE International Conference on S. 1-8. doi.

Yang et al. "Real-time concurrent linked list construction on the GPU" In: Computer graphics forum, vol. 29, 2010, No. 4, S. 1297-1304.—ISSN 0167-7055.

* cited by examiner

SYSTEMS AND METHODS OF PARTIAL FRAME BUFFER UPDATING

CROSS REFERENCE TO RELATED APPLICATIONS

This application claims priority from U.S. Provisional Application No. 61/697,785, which was filed on Sep. 6, 2012, and is hereby incorporated by reference in its entirety for all purposes.

BACKGROUND

Field

The following relates to graphics processing, graphics processing systems, such as Graphics Processor Units (GPUs), and in example particular aspects, compositing and image production techniques.

Related Art

Buffers used to store data waiting to be outputted to a display are typically called "frame buffers", evoking a concept of display of a frame of a temporal sequence of frames, where a "frame" is a complete set of pixel data. In some computation architectures, frame buffers also can serve as a source of data to be further processed, such as by a GPU.

In such a case, a GPU can read data from a frame buffer (e.g., a location in a memory storing image data, such as a bitmap), and use that data, along with other data, to form a composite image. The GPU then writes out data representing the entire composite image to an output frame buffer. A display controller can read the composite image from the output frame buffer, and cause the composite image to be displayed. Thus, an entire pixel dataset is stored to represent each displayable frame.

As a more concrete example, a conventional render and display system can be setup to implement a triple buffering approach, in which three portions of memory are reserved, each independently capable of holding a full resolution displayable frame (e.g., buffer 0, 1 and 2), and are arranged in a flip chain. For example a graphics processor can write consecutive frames to be displayed to buffers 0, 1, and 2, and then restart at 0. Similarly, a display controller reads buffers 0, 1, and 2, before returning to read buffer 0 again. Where pixel data is the same between any one or more of buffers 0, 1 or 2, that pixel data is repeated in all the buffers where it appears.

SUMMARY

In implementations according to the disclosure, data representing a plurality of render surfaces (e.g., a frame of pixel data to be displayed) includes a respective set of mappings between surface regions and memory segments for that render surface. Each render surface can be represented as a combination of pixel data from regions of a previous surface, and regions of pixel data determined to be different than pixel data from the previous surface.

As an example, a method of rendering includes storing data representing a first rendered surface including memory segments that store pixel data for respective regions of the first rendered surface, and a mapping between the regions and the respective memory segments. The method also comprises tracking a number of rendered surfaces that use pixel data in each memory segment. To store data representing a subsequent rendered surface that has regions of pixel data corresponding to regions of pixel data in the first rendered surface, the method comprises determining which regions in the subsequent rendered surface have pixel data that is unchanged from the first reference surface, and which regions have different pixel data. For the regions with the same pixel data, a mapping for the subsequent rendered surface is created to include a reference to the same memory segment as the first surface. For regions with different pixel data, such pixel data is written to memory segments obtained from a pool of free segments, and references thereto provided in the mapping. Counts of all the memory surfaces storing pixel data for the second surface are maintained, which can include incrementing a counter for each.

To read a surface stored according to the above approach, a device accesses the mapping for the surface to determine where (e.g., in a memory segment identified by a particular memory address) each region of pixel data for that surface is stored. The device accesses the pixel data and updates the tracking of the number of surfaces that use pixel data from those memory segments. Memory segments with pixel data that are no longer used by any surface can be released to return to a pool of free memory segments available to receive pixel data for further rendered surfaces.

Devices may implement methods according to the disclosure, and include devices that function both as sources of pixels ("pixel sources") and consumers of pixels ("pixel sinks") Sources of pixels may include a video encoder and a GPU, while consumers of pixels may include a GPU, and a display controller, for example. Thus, devices functioning as pixel sources would implement portions of the disclosure relating to producing (and potentially storing) data describing sequences of images, and pixel sinks would implement the portions of the disclosure relating to using the produced data for image processing or display operations.

Devices that may read surfaces written according to these aspects may include a display controller that uses a backing memory within a display. In such a situation, a display controller can prepare another frame for display by updating only portions of such a backing memory that have been changed. Whether or not a portion has been changed is determined by how the frame is encoded (references to prior-written data or new data written to a region of memory). What portions of the frame are updated may be determined by how the backing memory is addressed in a particular implementation.

BRIEF DESCRIPTION OF THE DRAWINGS

Various features and aspects of the disclosure will become more apparent from the following detailed description, which is to be read in conjunction with the accompanying drawings, in which.

DETAILED DESCRIPTION

Many common computing devices, such as a desktop, laptop, tablet, or cell phone, includes a graphics subsystem that can produce graphical data to display, such as a Liquid Crystal Display (LCD), or other suitable display technology. The display has a resolution, typically characterized as a number of horizontal and vertical pixels, such as a 1080p display, which has 1920 horizontal pixels (columns) and 1080 vertical pixels (rows). A refresh rate determines how often an image displayed on the display changes. Each distinct image displayed on the display can be considered a displayable frame.

In the context of storing image data in memory, it may be useful to conceptualize a memory surface as a plane having pixel locations distributed on the plane according to a pattern. Each pixel location would have an amount of storage allocated for storing the data representative of that pixel. Thus, for a 1080p display, the memory surface would include 1920×1080 pixels, each with a certain amount of storage space allocated, such as 4 bytes. However, the physical implementation of such memory surface can differ among implementations, and does not have to follow the conceptual model. In the context of the disclosure, a render surface is divided into regions, and each region contains some of the pixels in the surface. For example, a region can be a 8×8 square pixel block, a rectangle, a vertical or horizontal strip of pixels, and so on. More generally, a region can be any shape, although it is expected that the shape will be a rectangle, with a height and width each being one or more pixels, and typically at least one dimension being a plurality of pixels. A region could be formed of discontinuous pixels, but for simplicity, this description describes example implementations under an assumption that pixel regions are continuous.

A number of pixels in a region and a length versus width of a region can be selected based on system architecture considerations. For example, a design goal can be to match a memory page size to an amount of memory required to store a region of pixels. However, there is no requirement that a region of pixels be stored in a contiguous portion of memory. Rather, each region of pixels would have a known relative position to the other regions of pixels in a memory surface, such that all the pixels in the memory surface can be represented by arranging the pixels of the regions according to those relative positions. As such, a person of ordinary skill would understand that the pixel regions within a surface each are a logical construct of a particular grouping of pixels found in the surface.

In some situations, a render surface is congruent to a displayable frame, while in other situations, a render surface can be part of a displayable frame, may include a displayable frame and "off-screen" pixels, or may be image data to be rendered and stored in memory, or both. For example, pixel data can be rendered to a surface and stored for use as a texture and displayed.

Figure 1:
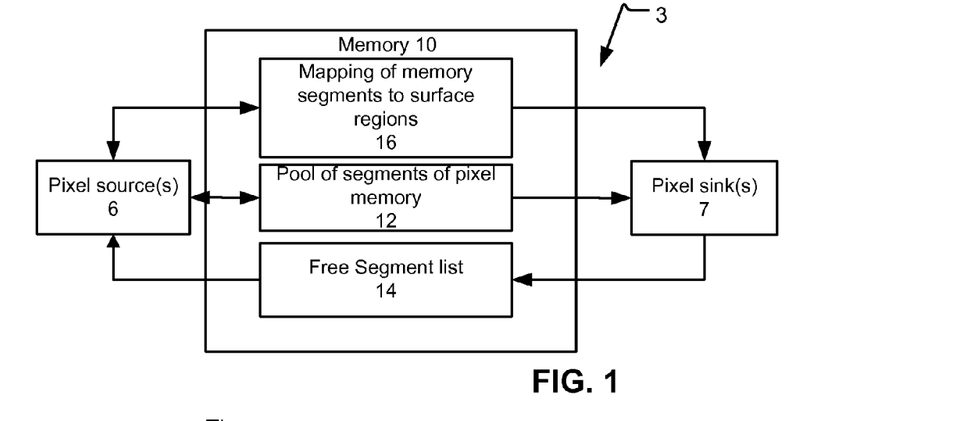
FIG. 1 depicts an overview of functional elements of a system in which method and structural aspects disclosed herein can be practiced.

FIG. 1 depicts a conceptual view of an implementation of a system 3 according to the disclosure. System 3 includes a pixel source 6, and a pixel sink 7, which respectively function to generate and consume pixel data. Pixel source 6 can read from and write to a memory 10. Pixel source 6 can read and write segments of pixel memory from a pool of memory segments 12 (e.g., writing and reading data for regions of a memory surface, as introduced above). Pool 12 can be implemented with dedicated memory, such as memory embedded in a graphics processor. Such memory can be dedicated for this purpose, or can be allocated when required. Pool 12 also can be implemented using memory private to a graphics processor, or memory shared between a graphics processor and other functional units. Memory resident control elements, such as lists of free regions in pool 12 also can be implemented in embedded memory. Implementations may embed a portion of pool 12 and memory resident control elements. In an example, pool of segments 12 may be enough memory to store at least three full frames of pixel data at a current operating display resolution, to implement triple buffering. Pixel source 6 also can read from a free segment list 14, which includes identifiers for memory segments available to store regions of pixel data for any surface being operated on by pixel source 6. As such, if pixel source 6 uses a memory segment from free segment list 14, pixel source 6 removes an identifier for that memory segment from free segment list 14. Pixel source 6 also can read from and write to memory 10 for updating a mapping 16 of memory segments to surface regions. By example, mapping 16 can be implemented with a list of regions for a particular memory surface, and identifying information for one or more memory segments storing pixel data for each of the listed regions. A plurality of such mappings 16 can be stored in memory 10, where each mapping is associated with a respective surface.

When a surface is to be used or displayed, the mapping associated with that particular surface is accessed to retrieve the list of memory segments storing pixel data in that surface, as explained below. As will be explained below, pixel sink 7 uses a selected mapping from mappings 16 to identify segments of memory to be accessed, in order to output a particular surface for display (e.g., to produce a displayable frame). Each mapping can reference memory segments from any one or more different surfaces, such that memory segments can be read from disparate and discontinuous memory locations.

Figure 2:
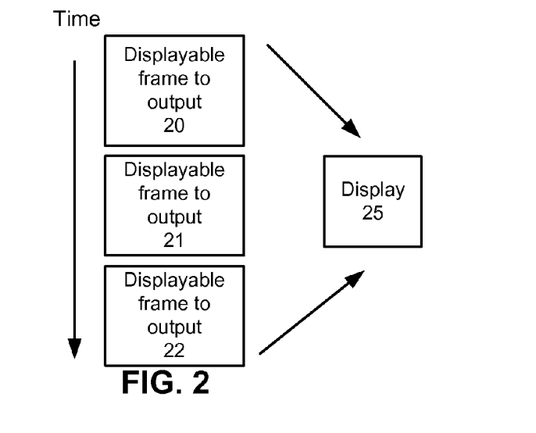
FIG. 2 depicts a temporal flow of displayable frames that can be constructed from one or more render surfaces (surface(s)), according to embodiments disclosed herein.

In an example application, pixel sink 7 includes a display controller which outputs a temporal sequence of displayable frames, such as depicted in FIG. 2, in which displayable frames 20, 21, and 21 are formed to be outputted for display on a display 25. This operation is in contrast with convention operation of a display controller, which may be given a location of a starting point for a frame to be displayed, and continuously reads data from that starting point to output a frame for display. Display controllers also can support scatter/gather operations. Display controllers also can have a memory management unit that supports virtualization of memory (supplying a contiguous segment of virtual memory that is implemented by different portions of physical memory). By way of further contrast, in implementations of the disclosure, pixel data stored in a single memory segment may be used by pixel sink 7 in forming multiple frames for display. For example, a region of pixel data stored in a given memory segment may be used in two or three consecutive in frames.

Figure 3:
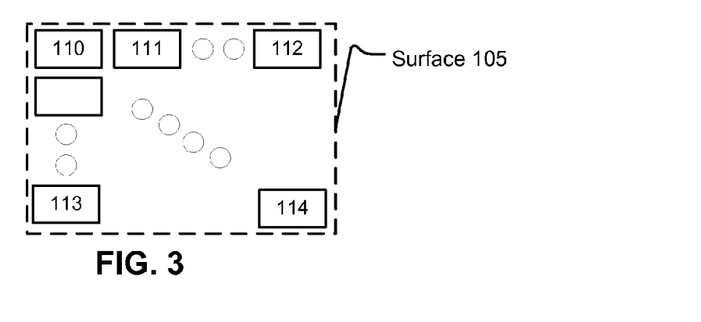
FIG. 3 depicts a representation of data defining a first surface divided into regions.

FIG. 3 depicts a surface 105 divided into regions 110-114. Each region has a defined number of rows and columns of pixels, so that each region has a defined number of pixels. A number of regions in horizontal and vertical directions are determined by the screen resolution (for a fixed region size). Region sizes can be selected for a particular target type of display, and based on considerations such as characteristics of pixel source 6 and sink 7, memory interface characteristics, and other implementation-specific criteria. In some implementations, surface 105 represents one surface of a series of surfaces, each having the same resolution and region subdivision, such that each pixel (or region of pixels) in surface 105 can be said to have a corresponding pixel (region) in other surfaces in that series of surfaces.

Figure 4:
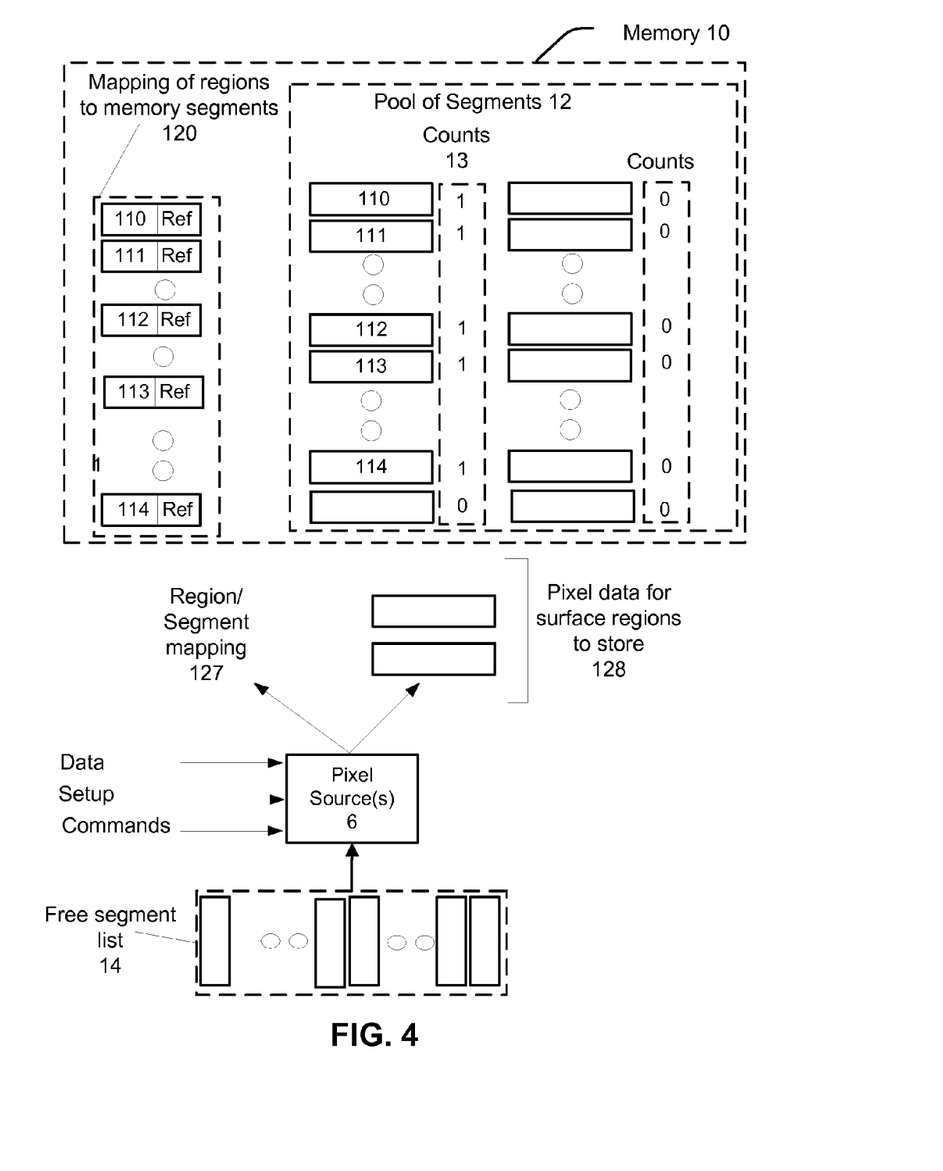
FIG. 4 depicts example aspects of a pixel source rendering a surface and storing regions of the rendered surface in memory segments, and producing a mapping of regions to memory segments, and a pixel sink consuming regions of the rendered surface.

FIG. 4 depicts aspects of operation of system 3 of FIG. 1 in order to produce pixel data for surface 105 of FIG. 3. FIG. 4 depicts pixel source 6 receiving information for rendering a surface of pixels, such information can include data, setup and command information, such as primitives, textures, lighting information, shaders, and so on. Outputs of pixel source 6 include mappings 127 between regions of surface 105 (e.g., regions 110-114) and memory segment identifiers ("Ref"), which are stored to produce a mapping 120 for all regions of surface 105.

Pixel data 128 for regions is generated and stored in memory segments from pool 12. Segments selected from pool 12 to store pixels for regions 110-114 are identified from free segment list 14. For example, memory addresses can be used as segment identifiers or parts of memory addresses. For example, a 32 bit or 64 bit memory address can be used. A 1080p frame has 2.0736 million pixels. For regions of 64 pixels, a frame would have 32,400 regions, and a set of 32-bit references would require about 130 KBytes of storage. Another implementation is to identify a base memory address for the pool of memory segments, such as 64 megabytes, which can store 24 or 32 bit color (e.g., 1 byte for each of RGB and an alpha channel for each pixel), and construct the indicators as offsets from that base memory address. Although byte-wise addressing 64 megabytes requires an address space of 26 bits, each region has a size of 256 bytes (for 4 byte pixels). Thus, the lower 8 bits would remain constant, and 18 bits can be used for each indicator. An example of another approach to represent a surface is to identify a prior surface and provide, for each region found to contain different pixel data than a corresponding region of the prior surface, an explicit identification of that region and a memory segment storing pixel data for that region. These examples are illustrative and not limiting.

In one approach, surface 105 represents one surface of a series of surfaces of the same format and resolution, such that data representing mapping 120 can be a series of references, such as memory references, in a pre-defined order, and each region does not need to be explicitly identified in connection with a reference to the memory segment storing its pixel information. Pixel sink 107 thus can access pixel data for a surface by reading the memory segments that store pixel data for each region of the surface; the order of the references to the memory segments implicitly defines a relative spatial arrangement of the regions of pixel data (such as for display). In turn, a convention can be established for the format of the pixel data within each region.

In conjunction with writing pixel data to selected memory segments, a set of counts 13 is maintained for the memory segments, which as explained below, tracks how many surfaces use each memory segment as a source of pixel data.

Free segment list 14 is updated to remove the memory segments used to store pixel data 128. This example shows a separate free segment list 14, which identifies free segments ready to receive pixel data. However, other implementations may use the counts directly, and identify which memory segments have 0-valued counts, and select memory segments to be used on that basis.

Thus, FIG. 4 depicts that mapping 120 identifies a set of memory segments that store the pixel data defining surface 105, and collectively, mapping 120 and that set of memory segments represent the rendered pixel data of surface 105. Each mapping, e.g., mapping 120 can be identified by a pointer or memory address. Such address or pointer can be provided to pixel sink 7, which uses the mapping identified thereby to determine any number of disparate memory segments from which pixel data for a surface can be retrieved. Thus, a flip chain for a triple buffering situation would include a sequence of pointers or memory addresses to three mappings. This approach accommodates dropping one of the surfaces in the sequence by removing a corresponding pointer or memory address from the sequence and decrementing counts associated with memory segments that stored pixel data for that surface. Therefore, as described below, if surface 105 is to be outputted for display or used in further processing, then mapping 120 is accessed to identify the memory segments storing the pixel data for surface 105 and then the pixel data is read from those memory segments. Before such operations are described, however, storage of data representing further rendered surfaces is described directly below.

Figure 5:
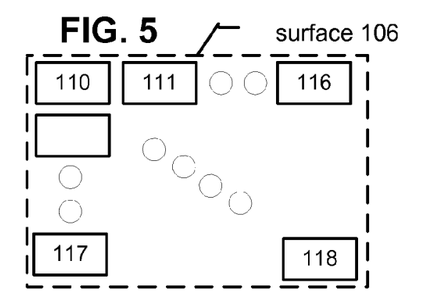
FIG. 5 depicts a representation of a second surface, including regions in common with the first surface.

FIG. 5 depicts a surface 106 as a collection of regions of pixel data, including regions that exist in surface 105 (i.e., the pixel data in these regions is the same as in the corresponding regions of surface 105). However, some regions of surface 106 differ from surface 105, and in particular, regions 116, 117 and 118 are different.

Figure 6:
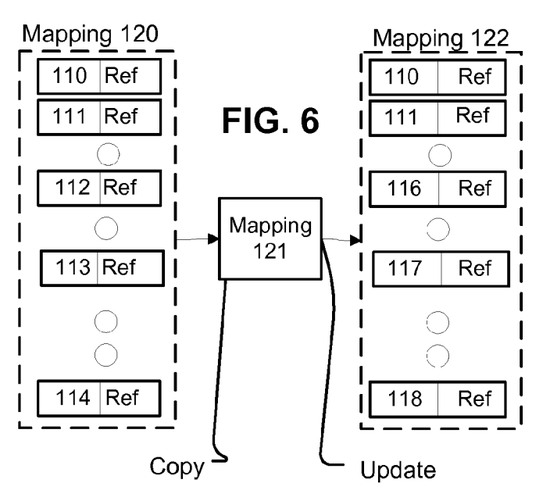
FIG. 6 depicts aspects of representing the second surface using regions of data representing the first surface, and a modified mapping of regions to memory segments.

FIG. 6 depicts mapping 120, which maps where regions of pixel data for surface 105 are stored, is copied to a mapping 121. A free memory segment for each region of pixel data different from surface 105 is obtained from free segment list 14, and pixel data is stored in those memory segments. Mapping 122 can be generated by updating mapping 121 to replace the identifiers for memory segments storing pixel data for surface 105 with the newly-obtained memory segments now storing pixel data for regions of surface 106. As depicted, now regions 116-118 have corresponding memory segment references listed in mapping 122.

Figure 7A:
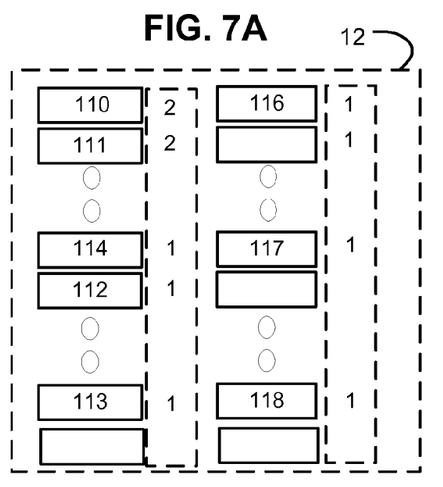
FIGS. 7A and 7B depicts further aspects of storing surface regions in memory segments.

Additionally, counts 13 for memory segments are maintained, as explained with respect to FIG. 7A. FIG. 7A depicts pool 12 of memory segments which collectively store pixel data for rendered surfaces. Now, certain memory segments store pixel data for both surface 105 and for surface 106, in particular, pixel data in regions 110 and 111 is the same and the memory segments storing such data, being populated when surface 105 was written, are used in defining surface 106. Counts 13 are incremented to reflect that data for those memory segments now is used to define two surfaces. Counts can be maintained in a dedicated memory portion in some implementations; for example, a processor designed to be capable of triple buffering can provide a memory store large enough to accommodate a 3-deep flip chain (2 bit counter), for a maximum supported resolution and a maximum granularity of region size. For example, in a 1080p display, and 64 pixel regions, about 64 k bits can be allocated for such a memory. In some cases, the region size may be fixed in the architecture. However, a maximum resolution may be variable. Also, where multiple displays are to be supported with a dedicated flip chain, or other working render surfaces are to be represented in memory according to the disclosure, such memory would need to be sized accordingly. In some examples, a memory controller can allocate a pre-determined memory size for storing up to a pre-determined number of full-resolution frames. Caching techniques can be employed in such memory as well.

Figure 7B:
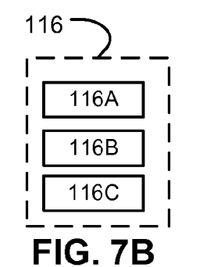

FIG. 7B depicts an example where each memory segment can be composed of a plurality of portions, potentially located in discontinuous memory regions; in particular, the segment storing pixel data for region 116 is depicted as being composed of portions 116A-C.

Figure 8:
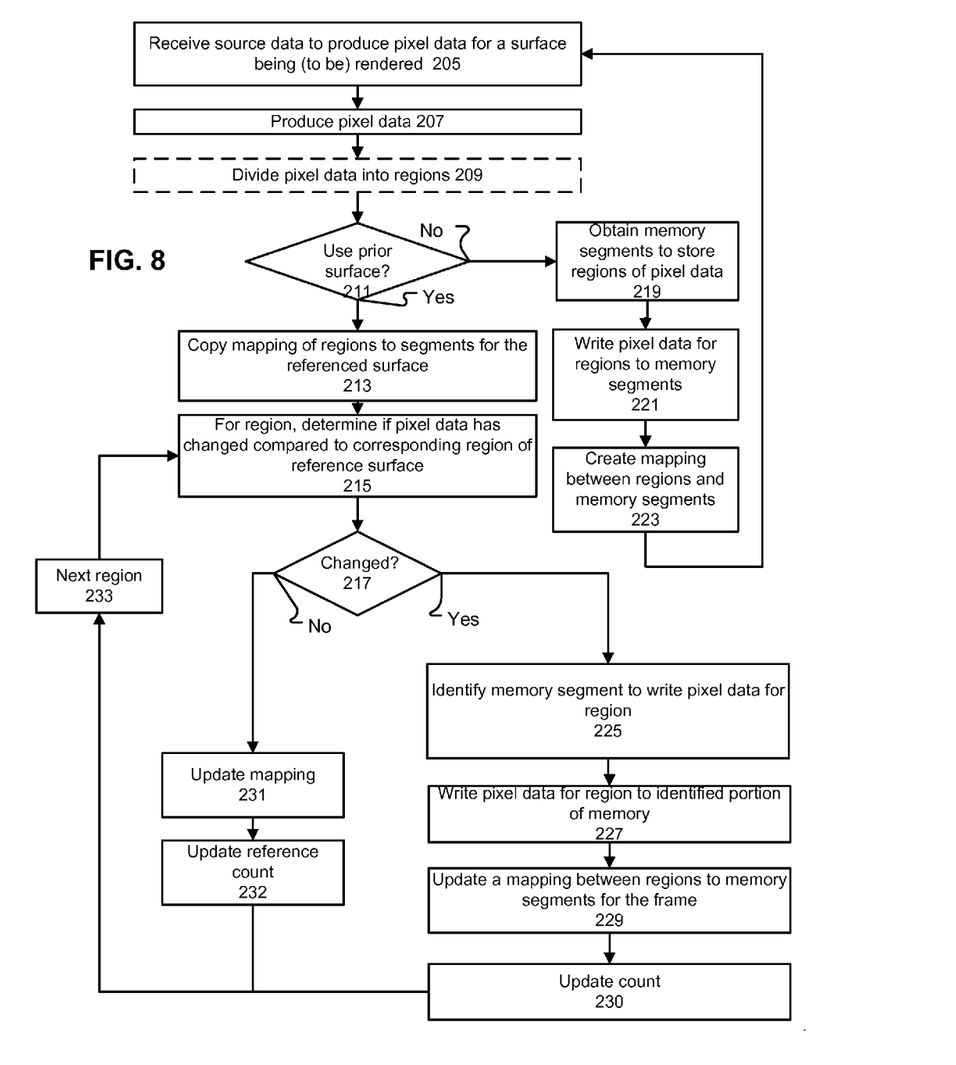
FIG. 8 depicts an example method of determining a set of data that represents the second surface, based on data representing the first surface, and memory segments storing data for regions of the second surface having different pixel data than the first surface.

FIG. 8 depicts an example method for storing pixel data for rendered surfaces, according to the disclosure. FIG. 8 depicts receiving 205 source data to produce pixel data in rendering a surface, and producing 207 such pixel data. In some implementations, the pixel data may be produced in regions, such as those depicted for surfaces 105 and 106, above. If the pixel data is not produced or otherwise divided into regions, then the pixel data is divided 209 into regions. At 211, a decision whether to represent the rendered surface using data from a previously rendered surface is made. In general, where regions of pixel data of the surface being rendered are the same as a previously rendered surface, then regions from that previously rendered surface can be used in defining the surface being rendered, and as introduced above, a mapping (e.g., mapping 120) for the previous surface is copied (213) and for each region of the surface being rendered, a determination (215) whether the pixel data is the same as or different from a corresponding region of the previous surface is made. If the pixel data for that region is not changed (217), then the mapping for the surface being rendered is updated (231) with an identifier for the memory segment in which to store the pixel data for the unchanged region, and at 232, the counts 13 are updated.

If pixel data in the region has changed, then, at 225, a memory segment is identified (such as from free segment list 14) and used to write (227) the rendered pixel data for that region. At 229, the mapping for the surface being rendered is updated to correlate the region and the memory segment storing pixel data for that region. At 230, counts 13 are updated.

In each case, an advance (233) to a subsequent region to be considered can be made. Each region of the surface being rendered can be processed according to the above-described flow, depicted by looping to 215, in order to consider the subsequent region. In the context of multi-buffering (e.g., triple buffering), in order to drop one of the surfaces, a memory address or pointer to the mapping for that surface is removed from a sequence and the counts for memory segments that stored regions of pixel data in that dropped surface.

However, if pixel data for the prior surface is not to be used in defining the surface to be rendered, then at 219, memory segments for storing regions of pixel data are obtained, at 221, pixel data for regions is written to corresponding memory segments, and at 223, a mapping between the regions and the memory segments is created.

Thus, FIG. 8 depicts that for a given surface being rendered (or more generally, for a surface to be represented by stored pixel data), that surface can be represented using memory segments storing pixel data for regions of an existing surface, with storage of pixel data that is different from that existing surface, and a mapping that explicates where each region of pixel data can be found. In these examples, regions of pixel data for one existing surface are used to define a surface being rendered; however, in other implementations, pixel data from multiple existing surfaces can be used.

A variety of approaches can be implemented to determine whether a given region includes different pixel data, compared with a corresponding region of an existing surface. In one example, a Cyclic Redundancy Check (CRC) or a hash of the pixel data in the corresponding region can be created and stored. Pixel data and a CRC for a region of a subsequent surface can be produced. The CRCs can be compared and if they do not match then the regions are determined to be different. In another example, a pixel by pixel comparison can be performed, such as in a hardware XOR unit. Still other heuristics can be implemented. For example, there may be approaches to determining a priori whether given regions of a surface are guaranteed not to be different. For example, in the context of compositing two surfaces (e.g., when superimposing a user interface over a background, such as an image), the user interface may have known boundaries, such that regions of pixel data outside of the known boundaries will be unchanged. For example, application programming interface calls may have information about boundaries of a surface affected by the call, such as a glscissor( ) call, which would allow exclusion of regions of pixel data not affected by such interface calls.

In a particular context of rendering architectures that use tiling approaches, where geometry found to exist within a tile of screen space are processed together (rather than processing the geometry in the exact submission order, regardless of where each element of geometry is mapped to screen space). In one example, when a pixel source is producing pixel data for a series of surfaces, where those surfaces are organized into a plurality of tiles, the pixel source obtains a write lock on a memory location that is to store pixel data for each tile, before the pixel source writes that pixel data. During production of the pixel data, the pixel source, or another element in the system writes pixel data to respective memory locations for any tile that has pixel data that is different from a corresponding tile in a previously rendered surface. Therefore, the obtaining of the write lock by the pixel source is an indication to a pixel sink that the pixel data in that particular tile has been updated, and needs to be read in order to assemble that surface (e.g., for display.) However, for other memory locations for which the pixel source did not obtain a write lock, a pixel sink can use that information to infer that the pixel data is the same as a previously rendered surface and will obtain pixel data for those tiles from corresponding tiles of the previously rendered surface.

In an implementation, a set of memory locations can be pre-allocated for the entire surface, but only populated with pixel data for tiles that have changed pixel data. As a byproduct of such allocation, a correspondence between tiles and memory locations can be established, and referenced by pixel source(s) and pixel sink(s). In another implementation, memory locations for all the tiles of a frame are not pre-allocated; rather, they can be allocated on demand. To account for variable tile write requirements and variable latency of allocation, a subset of pre-allocated memory locations can be maintained (e.g., 4, 8 or 16 locations can be maintained). In the allocation process, sideband data is maintained that identifies which tile's pixel data is stored in each location. In the latter implementation, the fact that memory was allocated for pixel data for an identified tile is an indication to pixel sink(s) that the pixel data for that tile has been updated.

The above description shows how a pixel source can generate data describing rendered surfaces in a way that conserves read and write memory bandwidth, and overall can increase efficiency of operations, such as compositing operations. For example, an entire region of an output frame can be composited, or only a region known to have some possibility of modification. As an example, during rendering of a surface or part thereof, composition data affecting each pixel can be maintained (e.g., depth sorting and blending operations). During the composition, such as during depth sorting (without translucency), a source of image data for each pixel can be determined. For example, in a windowing environment, whether a pixel is to be sourced from a given window or a background is determined. For each region, a flag can be maintained that keeps a running tally of the source of pixel data for pixels in that region. If any pixel is found to differ from a corresponding pixel, then the region containing that pixel can be flagged so that pixel data for that region can be stored. In some implementations, what image components will affect a given pixel or set of pixels may be available at different times. For example, in an 8×8 block, a reference to a visible surface for each pixel may be available. In compositing a window over a background, both the window and the background may be represented by respective pairs of triangle primitives that are mapped to a texture representing the window or background in memory. These data may have been generated previously by processor 75 or by video decoder 70, or made available from some other source. Primitives for each of the window and the background may have identifiers within a certain range, and a hardware mask can determine whether all pixel identifiers in a pixel line have an identifier in a given range or not (e.g., ANDing outputs of bitwise mask of each pixel ID).

Source identification also can be done during texturing, as a byproduct of determining a texture source. In many cases, texturing is a pixel-by-pixel process, such that as each pixel is textured, the source flag can be updated. Implementations can have an early out for such source testing; for example, if any pixel or group of pixels has been determined to require updating with respect to a reference image, then the remaining pixels in that tile do not need to be checked, since pixel data for the entire tile will be output, even if one pixel is different.

Figure 9:
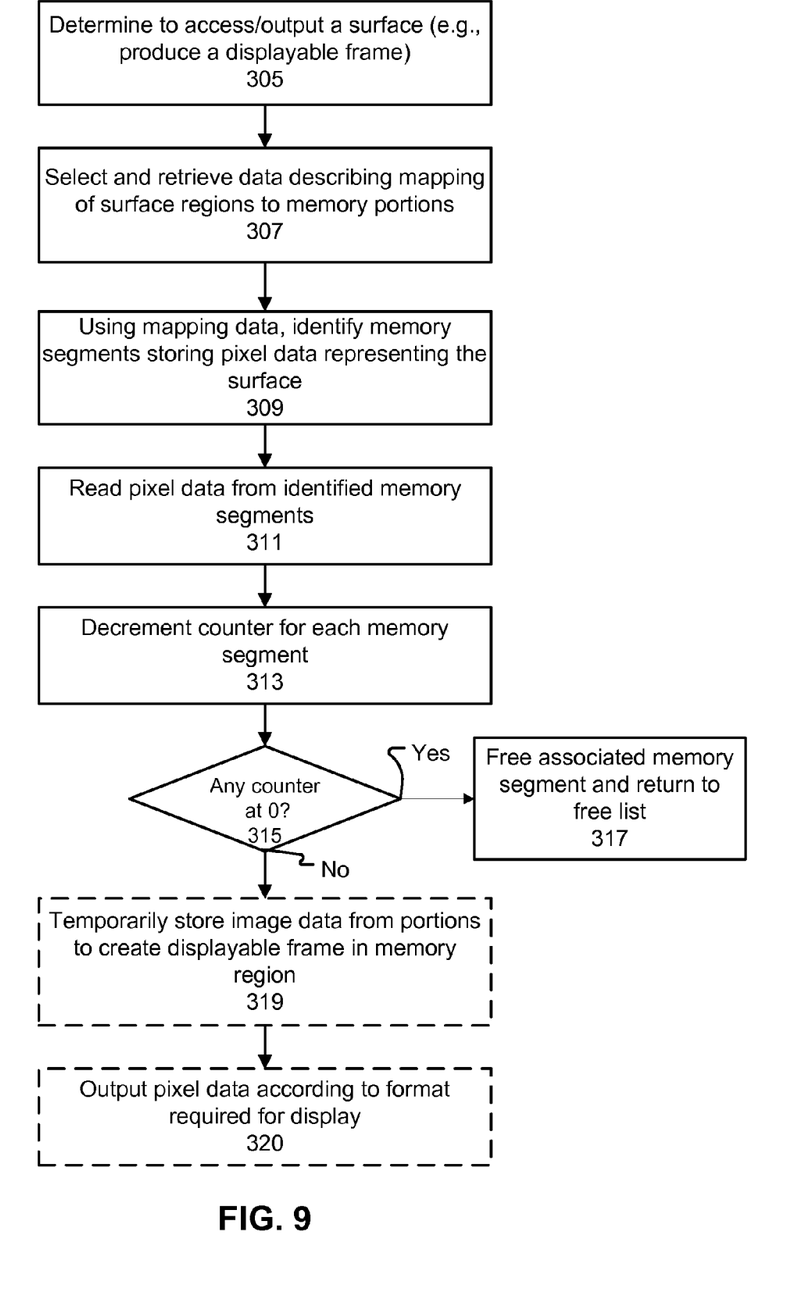
FIG. 9 depicts an example process of accessing a surface of pixel data, such as for producing a displayable frame, according to aspects of the disclosure.
Figure 10:
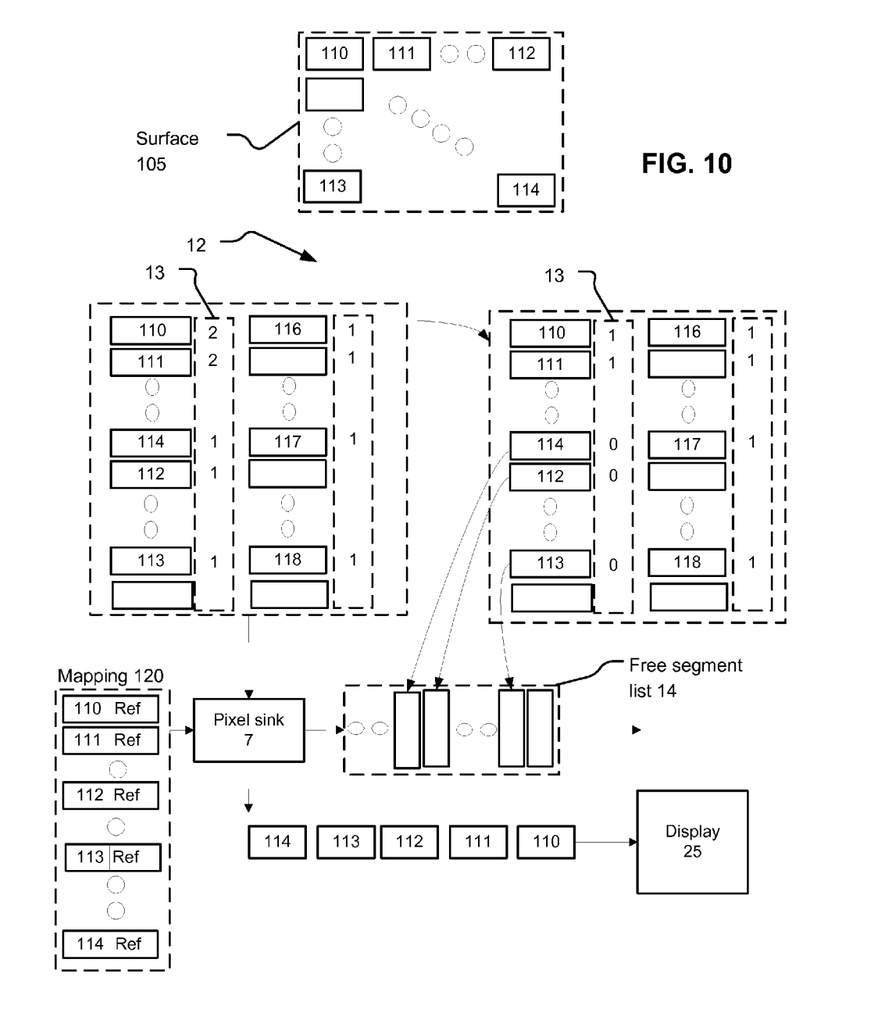
FIG. 10 depicts an example data flow in implementing the process of FIG. 9

FIGS. 9 and 10 are used to explain an example process for accessing a surface of pixel data represented according to the disclosure. At 305, a determination to access or output a surface is made (e.g., surface 105, as reproduced in FIG. 10), in order to perform a compositing operation, or to output a produce a displayable frame, for example. At 307, the process includes selecting and retrieving the mapping for the surface (e.g., mapping 120). At 309, using the mapping, memory segments storing pixel data for the surface are identified. Referencing mapping 120, for example, memory segments for regions 110-114 are identified and at 311, pixel data for these regions is retrieved from pool 12. At 313, each counter (of counters 13) for a memory segment that was read at 311 is decremented. At 315, any counters that have reached 0 are identified (e.g., counters for memory segments storing pixel data for regions 112-114), and freed to be returned to free segment list 14.

If the pixel data is being read for display, example further process portions can include, at 319, temporarily storing the pixel data and at 320, that pixel data can be outputted in a format appropriate for display (as shown, e.g., in FIG. 10). A display controller can implement the process of FIG. 9; e.g., pixel sink 7 can include a display controller. In other examples, the process of FIG. 9 may be implemented by a processor, such as a graphics processor, in order to obtain pixel data for a surface and conduct further graphics operations using the pixel data, and in still other implementations both a graphics processor and a display controller can implement a process according to FIG. 9.

Figure 11:
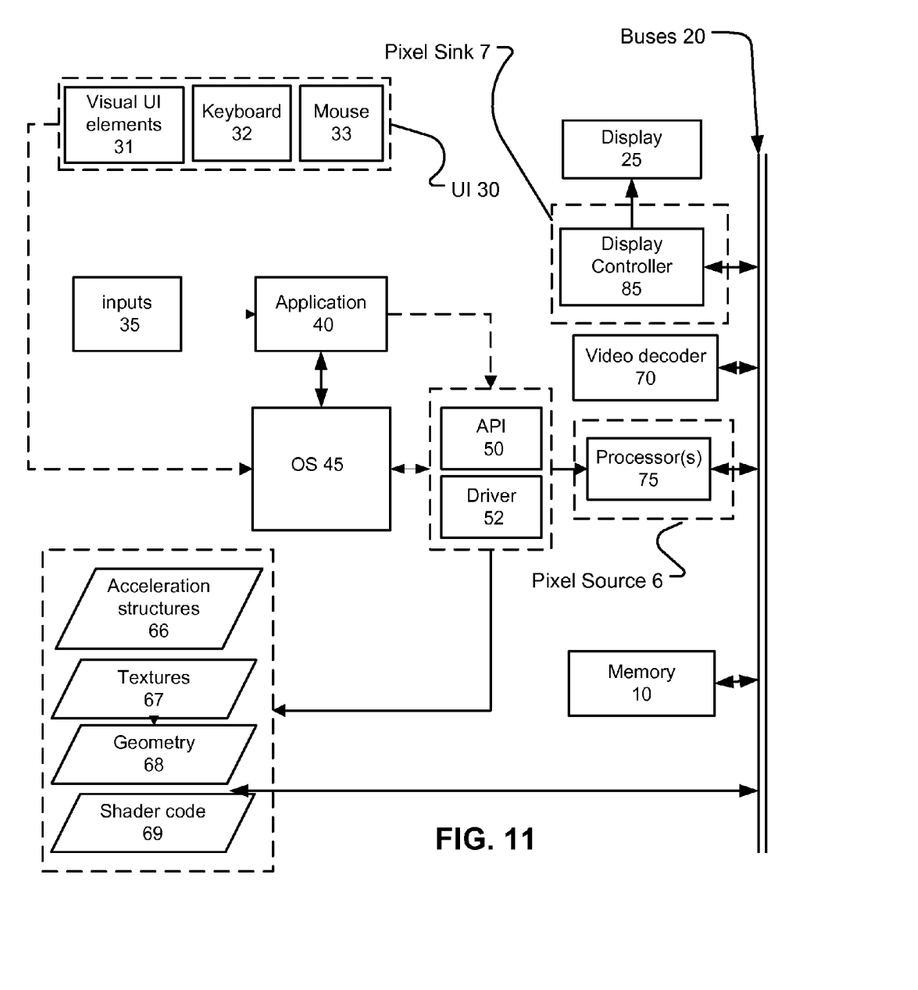
FIG. 11 depicts aspects of a system in which disclosed aspects can be practiced.

FIG. 11 depicts elements of an example system in which disclosed aspects may be practiced. In FIG. 11, pixel source 6 (from FIG. 1) is represented by processor 75, and pixel sink 7 is represented by display controller (85), although as disclosed above, processor 75 also can function as a pixel sink as well, and there can be sources of pixel data other than processor 75. Additionally, a video decoder 70, and memory 10 can couple to processor 75 over buses 20. Display 25 can couple to display controller 85.

An API 50 and a driver 52 for processor 75 can be provided to interface processor 75 with software such as operation system 45 and application 40. Application 40 can receive inputs 35, and produce data, setup and commands used for rendering a surface. Other rendering inputs can include acceleration structures 66, textures 67, geometry, 68 and shader code 69, which can be accessed through driver 52, or by application 40, or both. Operating system 45 also may receive inputs from user interface 30, which can include one or more of a visual UI element 31, a keyboard 32, and mouse 33, for example. For example, application 40 may interface with processor 75 using one or more of OpenGL®, OpenCL®, OpenRL®, DirectX®, or another suitable API. Driver 52 may receive API calls from application 40, and convert such calls into computational setup appropriate for processor 75.

Application 40 may run on an OS 45, which may provide API calls allowing resizing and movement of a window within an available screen space and may provide effects such as translucency. As such, windowing process 47 may track locations and dimensions for all windows and any other items available to be displayed, such as icons on a desktop, a screensaver, background wallpaper, and so on.

Application 40 may receive inputs generated from UI elements, including a visual UI element 25 (e.g., an onscreen menu capable of eliciting touch input), a keyboard 26, or a mouse 27, by example. Such inputs may be processed by OS 45 and directed to application 40. Application 40 also may use an API to communicate with OS 45. OS 45 may make a variety of different functions available to application 40 through such API.

Processor 75 may render surfaces using a deferred shading approach, where texturing and other pixel-oriented operations are delayed until after visible surface determination. Regions of a surface (e.g., surface 105) can be rendered in a tile-based renderer; in an example, there is a 1:1 correspondence between tiles and regions.

Display controller 85 reads memory segments identified using mappings, each of which correspond to a surface available for reading. Display controller 85 may have or control a temporary buffer available in order to assemble pixel data from memory segments that are read. In some devices, display controller 85 also may be able to perform functions such as scaling, rotation, cropping, and multi-monitor operation. Therefore, the disclosure does not imply that pixel data read by display controller 85 must be displayed unmodified. Some implementations may provide a display controller that operates according to the description, but which can control persistent storage resident with a display (e.g., backing memory for a display, such as an LCD). For example, such a display controller can cause regions of such a backing memory to be updated, for a particular frame, while other regions of the memory for that frame are not changed.

Figure 12:
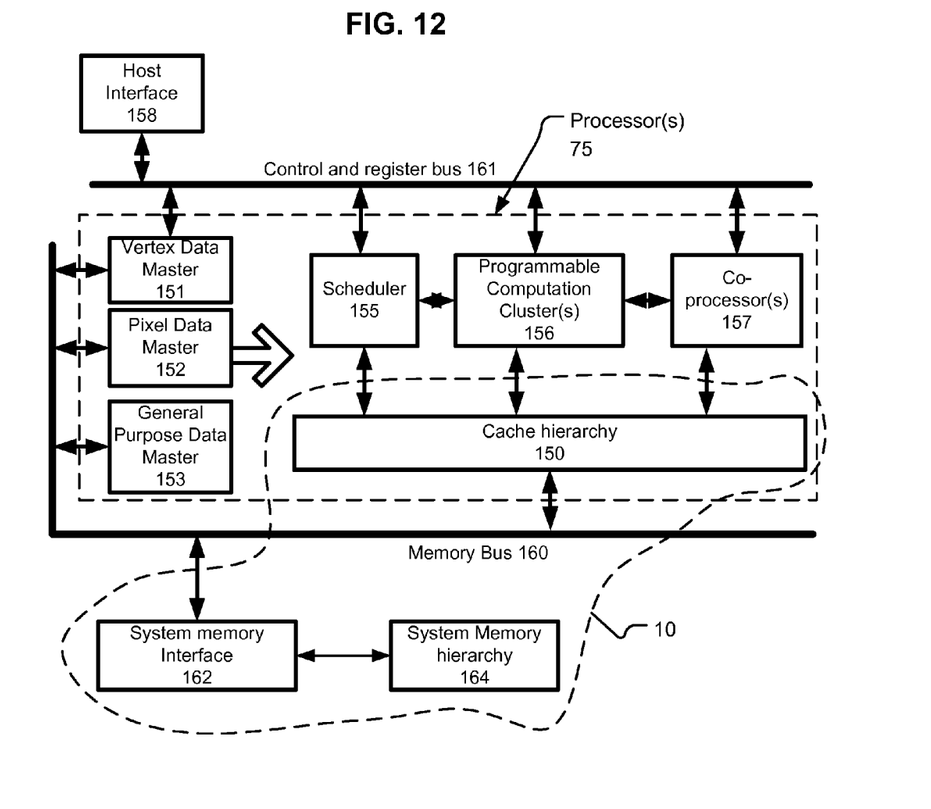
FIG. 12 depicts aspects of an example processor that can be configured to perform aspects of the disclosure.

FIG. 12 depicts aspects of an example construction of processor 75, with some context. Processor 75 can include a programmable computation cluster 156, a set of co-processors 157, and a scheduler 155. Each of these units, or some portion thereof can communicate with a cache hierarchy 150, which in turn communicates with a memory bus 160. A variety of data masters can setup computation to be scheduled and executed in processor 75; examples include vertex data master 151, pixel data master 152, and a general purpose data master 153. A host interface 158 can communicate with processor 75 through a control and bus 161. Memory bus 160 and control and register bus 161 can be part of busses 20 of FIG. 1. A system memory interface 162 interfaces memory bus 160 to a system memory hierarchy 164.

Each of the elements depicted in FIG. 12 can have constituent elements, which are not depicted for sake of clarity. For example, programmable computation cluster 156 can have a plurality of computation clusters, each with a local scheduler, and scheduler 155 can globally allocate computation among those clusters. Co-processors 170 can include texture co-processors, or co-processors for other kinds of algorithms (or portions thereof) that may be beneficially implemented in fixed-function hardware, as opposed to execution in programmable cluster 165. For example, memory 10 can be constituted by a number of different physical memories, including working memories not explicitly identified in the figures. For example, the counts described above can be stored in a working memory local to processor 75, which can have fixed or partially fixed function hardware that maintains these counts.

For clarity of description, conventional elements have not been described or have been described abstractly. The described functionality may be implemented differently for different implementations, such that different implementations may have components that implement various and different groupings of functionality. By example, memory storing pixel data may be implemented in a memory shared with memory allocated to threads of computation, and for other purposes. In some implementations, there may be a dedicated video memory for storing pixel data, while working memory for applications and threads may be provided in a separate memory or memories. The memories may use common elements of a memory hierarchy, such as a shared main memory. The various data structures and data types depicted also may reside in the same physical memory. Sources of such data may include network connections, and buffers within network devices. The above disclosed examples related most directly to a situation where a graphics processor, such as a 3-D graphics processor (which can be implemented by one or more of a Graphics Processor Unit, or a general purpose processor programmed to perform graphics processing), is a pixel source, and where a display controller is a pixel sink.

In various embodiments, relative to a graphics processing unit, pixel sources can include a video decoder (e.g., processing elements that can input a compressed video stream and output surfaces of pixel data for display) and a wireless display receiver. Wireless display transmitters can be pixel sinks. In some implementations, pixel sources and sinks can be within the same system, or within the same system on chip, or the same device, while in other implementations, pixel sources and pixel sinks can be separated by one or more networks, or temporally separated, or combinations thereof. For example, a graphics processor and a video decoder can be both a pixel source and sink, by writing pixel data at one time and reading that pixel data back at a later time.

As would be apparent from the disclosure, some of the components and functionality disclosed may be implemented in hardware, software, firmware, or a combination thereof. If implemented in firmware and/or software, the functions may be stored as one or more instructions or code on a machine-readable medium. In one example, the media is non-transitory. Examples include a computer-readable medium encoded with a data structure and a computer-readable medium encoded with a computer program. Other kinds of media include transmission media. A non-transitory medium may be any tangible medium that can be accessed by a machine. By way of example, and not limitation, media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in a machine usable medium including non-transitory memories such as memories using semiconductor, magnetic disk, optical disk, ferrous, resistive memory, flash memory, and so on. Such machine readable information can be accessed over networks from network attached storage, from storage area networks, from remote file servers, and so on.

Various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

With respect to example processes, the drawings include relative ordering of process components, solely as an aid in understanding the description. Such relative ordering is not an implicit disclosure of any specific limitation on ordering or arrangement of process components. In general, process limitations may be interchanged sequentially without departing from the scope of the disclosure, and means-plus-function clauses in the claims are intended to cover the structures described as performing the recited function that include not only structural equivalents, but also equivalent structures.

Further, certain subdivisions of components and processes have been selected, but these implementations according to the disclosure are not required to maintain these subdivisions, and can allocate or group functions differently. For example, such functionality can be distributed differently or performed in components other than, additional to, or less than, those identified herein. Rather, the described features and steps are disclosed as examples of components of systems and methods within the scope of the appended claims.

The invention claimed is:

1. A method of storing pixel image data for regions of a render surface, comprising:
   providing a plurality of render surfaces, each comprising a plurality of regions of pixel image data; and
   for each render surface:
      determining which regions of the plurality of regions have different pixel image data values than values in a respective corresponding region of pixel image data from a previous render surface, and which regions of the plurality of regions have the same pixel image data values as values in a respective corresponding region of pixel image data from the previous render surface, wherein pixel image data for each region of the previous render surface is stored in a respective segment of memory,
      responsive to determining that a region has different pixel image data values than values in the respective corresponding region of pixel image data from the previous render surface, storing the pixel image data for that region in a respective memory segment of the memory, and storing a reference to said memory segment for that region, and
      responsive to determining that a region has the same pixel image data values as values in the respective corresponding region of pixel image data from the previous render surface, storing a reference to the memory segment storing the pixel image data for that region of the previous render surface.

2. The method of claim 1, further comprising incrementing a respective count associated with each memory segment storing a region of pixel image data determined to be the same in the render surface and the previous render surface.

3. The method of claim 2, further comprising decrementing a respective count associated with each memory segment responsive to consuming the pixel image data from the memory segment.

4. The method of claim 1, wherein the references to a-memory segments comprises the memory addresses of the respective memory segments.

5. A computer graphics system configured to store pixel image-data for regions of a render surface, comprising:
   a pixel data source for providing render surfaces each having a plurality of regions of pixel data, wherein the pixel data source is configured to, for each render surface:
      determine which regions of the plurality of regions of pixel data for the render surface have different pixel data values than values in a respective corresponding region of pixel data from a previous render surface, and which regions of the plurality of regions have the same pixel data values as values in a respective corresponding region of pixel data from the previous render surface, where pixel data for each region of the previous render surface is stored in a respective segment of memory, and
      responsive to determining that a region has different pixel data values than values in the respective corresponding region of pixel data from the previous render surface, store the pixel data for that region in a respective memory segment of the memory, and store a reference to said memory segment for that region, and
      responsive to determining that a region has the same pixel data values as values in the respective corresponding region of pixel data from the previous render surface, store a reference to the memory segment storing the pixel data for that region of the previous render surface.

6. The computer graphics system of claim 5, wherein the system is configured to increment a respective count associated with each memory segment storing a region of pixel data determined to be the same in the render surface and the previous render surface.

7. The computer graphics system of claim 6, wherein the system is configured to decrement a respective count associated with each memory segment responsive to consuming the pixel data from the memory segment.

8. The computer graphics system of claim 5, wherein the pixel source comprises one or more of a 3-D graphics processor and a video encoder.

9. The computer graphics system of claim 5, the computer graphics system further comprising a pixel data sink for reading pixel image data values for a selected render surface, the pixel data sink configured to:
   read a mapping between each region of the selected render surface and a reference to a memory segment storing pixel image data values for that region;
   read from respective memory segments data representing each region of the selected render surface; and
   use the read data.

10. The computer graphics system of claim 9, further comprising a memory unit configured to maintain a pool of memory segments, for storing pixel image data values, wherein each memory segments is identified by a respective reference and wherein the memory unit is configured to determine based on stored counts, which memory segments are no longer used to store pixel image data values for any render surface.

11. The computer graphics system of claim 10, further comprising a free segment list identifying memory segments from the pool that are available to store pixel image data values and wherein:
   the pixel data source is configured to obtain memory segments from the list in which to stored pixel image data values and to update the list to remove therefrom memory segments obtained; and
   the memory unit is configured to return memory segments that are no longer used to the free segment list.

12. A non-transitory machine-readable medium having stored thereon a computer readable description in a hardware description language that, when processed, enables fabrication of a computer graphics apparatus configured to store pixel data for regions of a render surface comprising:
   a pixel data source for providing render surfaces each having a plurality of regions of pixel data, wherein the pixel data source configured to, for each render surface:
      determine which regions of the plurality of regions of pixel data for the render surface have different pixel data values than values in a respective corresponding region of pixel data from a previous render surface, and which regions of the plurality of regions have the same pixel data values as values in a respective corresponding region of pixel data from the previous render surface, where pixel data for each region of the previous render surface is stored in a respective segment of memory,
      responsive to determining that a region has different pixel data values than values in the respective corresponding region of pixel data from the previous render surface,
      store the pixel data for that region in a respective memory segment of the memory, and store a reference to said memory segment for that region, and
      responsive to determining that a region has the same pixel data values as values in the respective corresponding region of pixel data from the previous render surface, store a reference to the memory segment storing the pixel data for that region of the previous render surface.

13. The non-transitory machine-readable medium of claim 12, wherein the computer graphics apparatus is further configured to increment a respective count associated with each memory segment storing a region of pixel data determined to be the same in the render surface and the previous render surface.

14. The non-transitory machine-readable medium of claim 13, wherein the computer graphics apparatus is further configured to decrement a respective count associated with each memory segment responsive to consuming the pixel data from the memory segment.

15. The non-transitory machine-readable medium of claim 12, wherein the pixel source comprises one or more of a 3-D graphics processor and a video encoder.

16. The non-transitory machine-readable medium of claim 12, wherein the computer graphics apparatus further comprises a pixel data sink for reading pixel image data values for a selected render surface, the pixel data sink configured to:
   read a mapping between each region of the selected render surface and a reference to a memory segment storing pixel image data values for that region;
   read from respective memory segments data representing each region of the selected render surface; and
   use the read data.

17. The non-transitory machine-readable medium of claim 16, wherein the computer graphics apparatus further comprises a memory unit configured to maintain a pool of memory segments, for storing pixel image data values, wherein each memory segments is identified by a respective reference and wherein the memory unit is configured to determine based on stored counts, which memory segments are no longer used to store pixel image data values for any render surface.

* * * * *